(12) United States Patent
Baxter et al.

(10) Patent No.: US 12,030,000 B2
(45) Date of Patent: Jul. 9, 2024

(54) VESSEL AND METHOD FOR SOLID-LIQUID SEPARATION

(71) Applicant: Sustainable Energy Solutions, Inc., Provo, UT (US)

(72) Inventors: Larry Baxter, Orem, UT (US); David Frankman, Provo, UT (US); Skyler Chamberlain, Provo, UT (US); Kyler Stitt, Lindon, UT (US); Christopher Hoeger, Provo, UT (US); Eric Mansfield, Spanish Fork, UT (US); Andrew Baxter, Spanish Fork, UT (US); Nathan Davis, Bountiful, UT (US)

(73) Assignee: Sustainable Energy Solutions, LLC, Ball Ground, GA (US)

( * ) Notice: Subject to any disclaimer, the term of this patent is extended or adjusted under 35 U.S.C. 154(b) by 236 days.

(21) Appl. No.: 15/852,674

(22) Filed: Dec. 22, 2017

(65) Prior Publication Data

US 2019/0192998 A1 Jun. 27, 2019

(51) Int. Cl.
| | |
|---|---|
| *B01D 21/00* | (2006.01) |
| *B01D 17/02* | (2006.01) |
| *B01D 21/02* | (2006.01) |
| *B01D 21/24* | (2006.01) |
| *F25J 3/08* | (2006.01) |

(52) U.S. Cl.
CPC ............ *B01D 21/009* (2013.01); *B01D 17/02* (2013.01); *B01D 17/0214* (2013.01); *B01D 21/0024* (2013.01); *B01D 21/10* (2013.01); *B01D 21/2405* (2013.01); *F25J 3/08* (2013.01); *F25J 2205/02* (2013.01); *F25J 2205/20* (2013.01); *F25J 2220/66* (2013.01)

(58) Field of Classification Search
None
See application file for complete search history.

(56) References Cited

U.S. PATENT DOCUMENTS

| | | | | |
|---|---|---|---|---|
| 4,001,116 | A * | 1/1977 | Selcukoglu | F25J 3/067 585/812 |
| 5,819,555 | A * | 10/1998 | Engdahl | F25J 3/065 62/637 |
| 8,585,802 | B2 * | 11/2013 | Keller | C10K 1/165 423/220 |
| 8,747,520 | B2 * | 6/2014 | Bearden | B01D 53/002 95/94 |
| 9,254,448 | B2 * | 2/2016 | Turner | B01B 1/005 |
| 10,006,700 | B2 * | 6/2018 | Urbanski | B01D 3/008 |
| 11,028,968 | B2 * | 6/2021 | Clodic | F26B 5/00 |

(Continued)

*Primary Examiner* — Robert J Popovics
(74) *Attorney, Agent, or Firm* — Cook Alex Ltd.

(57) ABSTRACT

Devices, systems, and methods for separating solids from liquids are disclosed. A vessel includes an inlet, a carrier liquid outlet, a product outlet, a purifying section, and a heater. The inlet directs a slurry into the purifying section. The slurry comprises particles of a solid and a carrier liquid. The purifying section preferentially drives the particles of the solid towards a heating zone of the purifying section versus the carrier liquid. This displaces a first portion of the carrier liquid away from the heating zone of the purifying section. The heater heats the slurry. The carrier liquid outlet drives a majority of the carrier liquid out of the vessel. The product outlet is adjacent to the heating zone of the purifying section.

3 Claims, 5 Drawing Sheets

(56) References Cited

U.S. PATENT DOCUMENTS

| | | | | |
|---|---|---|---|---|
| 11,668,266 | B2* | 6/2023 | Song | F23C 9/00 |
| | | | | 137/81.1 |
| 2008/0302133 | A1* | 12/2008 | Saysset | F25J 3/067 |
| | | | | 62/617 |
| 2010/0147022 | A1* | 6/2010 | Hart | F25J 3/0242 |
| | | | | 62/601 |
| 2011/0094264 | A1* | 4/2011 | Geers | F25J 3/067 |
| | | | | 62/618 |
| 2011/0265512 | A1* | 11/2011 | Bearden | B01D 53/002 |
| | | | | 62/617 |
| 2012/0125043 | A1* | 5/2012 | Cullinane | F25J 3/0233 |
| | | | | 62/620 |
| 2016/0040930 | A1* | 2/2016 | Cullinane | B01D 7/02 |
| | | | | 62/625 |
| 2018/0280840 | A1* | 10/2018 | Baxter | B01D 33/00 |
| 2019/0192998 | A1* | 6/2019 | Baxter | B01D 21/009 |
| 2020/0291901 | A1* | 9/2020 | Song | F02M 21/0215 |
| 2023/0149852 | A1* | 5/2023 | Umeda | F25J 3/067 |
| | | | | 423/220 |

* cited by examiner

400

401
Pass a slurry into a purifying section of a vessel

402
Convey the plurality of particles of the solid preferentially towards a heating portion of the purifying section versus the carrier liquid

403
Displace a portion of the carrier liquid away from the heating portion

404
Heat the heating portion of the purifying section

405
Drive the carrier liquid out of the vessel

501
Pass a slurry into a purifying section of a vessel

502
Convey the plurality of particles of the solid preferentially towards a heating portion of the purifying section versus the carrier liquid

503
Displace a portion of the carrier liquid away from the heating portion

504
A portion of the plurality of particles of the solid are sintered, driving out a portion of the carrier liquid

505
Melt the solids to form a product liquid, driving out a portion of the carrier liquid

506
Drive the carrier liquid out of the vessel

507
Drive the product liquid out of the vessel

FIG. 5

VESSEL AND METHOD FOR SOLID-LIQUID SEPARATION

GOVERNMENT INTEREST STATEMENT

This invention was made with government support under DE-FE0028697 awarded by the Department of Energy. The government has certain rights in the invention.

FIELD OF THE INVENTION

The devices, systems, and methods described herein relate generally to solid-liquid separations. More particularly, the devices, systems, and methods described herein relate to solid-liquid separations using displacement of liquids by solids.

BACKGROUND

Separations of solids and liquids is a challenge in nearly every industry. The challenge is greatly increased in cryogenic situations, where the solids involved are at extreme low temperatures and sublimate directly to gases at ambient pressures. Solids filtration is complicated by clogging at one extreme, and solids passing through oversized holes on the other extreme.

SUMMARY

Devices, systems, and methods for separating solids from liquids are disclosed. A vessel includes an inlet, a carrier liquid outlet, a product outlet, a purifying section, and a heater. The inlet is adapted to direct a slurry into the purifying section. The slurry comprises particles of a solid and a carrier liquid. The purifying section is adapted to preferentially convey the particles of the solid towards a heating zone of the purifying section versus the carrier liquid. This displaces a first portion of the carrier liquid away from the heating zone of the purifying section. The heater heats the slurry. The carrier liquid outlet drives a majority of the carrier liquid out of the vessel. The product outlet is adjacent to the heating zone of the purifying section.

The heater may heat the slurry such that at least a portion of the particles of the solid sinter to form sintered particles. The sintered particles may have reduced porosity and reduced interstitial space versus the particles of the solid. The reduced interstitial space and the reduced porosity may displace a second portion of the carrier liquid.

A recycle outlet may be included that recycles at least a portion of the one or more particles of the product solid to the inlet.

The heater may heat the slurry, melting the particles of the solid to form a product liquid. The heater may be a heat exchanger. The product liquid outlet may direct a portion of the product liquid through the heat exchanger to produce a hot recycle liquid. The hot recycle liquid may be recycled into the purifying section of the vessel to melt the particles of the solid.

The heater may include tubes carrying a hot fluid, resistive heating elements, or a combination thereof. These may pass through the purifying section, be strapped to an outside of the purifying section, or a combination thereof.

The inlet may receive the slurry under an inlet pressure. The inlet pressure may act to compress at least a portion of the particles of the solid in lateral and transverse directions through the Poisson ratio, expelling liquid from interstitial space between and pores in the particles of the solid.

A cooling jacket may be included around an end of the purifying section adjacent to the carrier liquid outlet.

The carrier liquid may include water, hydrocarbons, liquid ammonia, cryogenic liquids, or a combination thereof. The solids may include water, hydrocarbons, ammonia, solid acid gases, or a combination thereof. The term "cryogenic liquid" is intended to refer to a liquid with a normal boiling point typically below −58° F. (−50° C.). The most commonly used industrial gases that are transported, handled, and stored in the liquid state at cryogenic temperatures are argon, helium, hydrogen, nitrogen, oxygen, and acid gases.

BRIEF DESCRIPTION OF THE DRAWINGS

In order that the advantages of the described devices, systems, and methods will be readily understood, a more particular description of the described devices, systems, and methods briefly described above will be rendered by reference to specific embodiments illustrated in the appended drawings. Understanding that these drawings depict only typical embodiments of the described devices, systems, and methods and are not therefore to be considered limiting of its scope, the devices, systems, and methods will be described and explained with additional specificity and detail through use of the accompanying drawings, in which:

FIG. 4 is diagram of the method for separating solids and liquids.

FIG. 5 is method for separating solids and liquids.

DETAILED DESCRIPTION

It will be readily understood that the components of the described devices, systems, and methods, as generally described and illustrated in the Figures herein, could be arranged and designed in a wide variety of different configurations. Thus, the following more detailed description of the embodiments of the described devices, systems, and methods, as represented in the Figures, is not intended to limit the scope of the described devices, systems, and methods, as claimed, but is merely representative of certain examples of presently contemplated embodiments in accordance with the described devices, systems, and methods.

Many cryogenic solids act in ways seemingly contradictory to what we expect from solids. Normally, solids melt into a liquid, which then vaporize into a gas. Many cryogenic liquids, such as carbon dioxide and other acid gases, have phase diagrams that, at ambient pressures, will sublimate from solid directly to gas. In materials handling, liquids are simple to transport when compared to both solids and gases. Gases require large equipment to transport similar masses in comparison to liquid. The devices, systems, and methods disclosed herein overcome these challenges and others by selectively displacing the carrier liquid with the solids, with compressed solids, with melted solids as a product liquid, or a combination of these effects. The carrier liquid is driven by these displacement effects counter to the direction of the product flow, resulting in a purification of the carrier liquid and the solids.

The examples of cryogenic systems do not imply that only cryogenic systems or desublimating solids can be used in the devices, systems, and methods disclosed herein. Any liquid-solid system where the solid can be sintered, melted, or a combination thereof, and the liquid stays in the liquid phase through the changes the solid goes through, may be used.

The term "sintering" when used herein is intended to convey both the fusing of separate particles into a larger particle (i.e., reduction of interstitial space) as well as the collapse of internal pores, reducing porosities.

A downcomer is a pipe or narrow vessel for the downward transport of materials.

Figure 1:
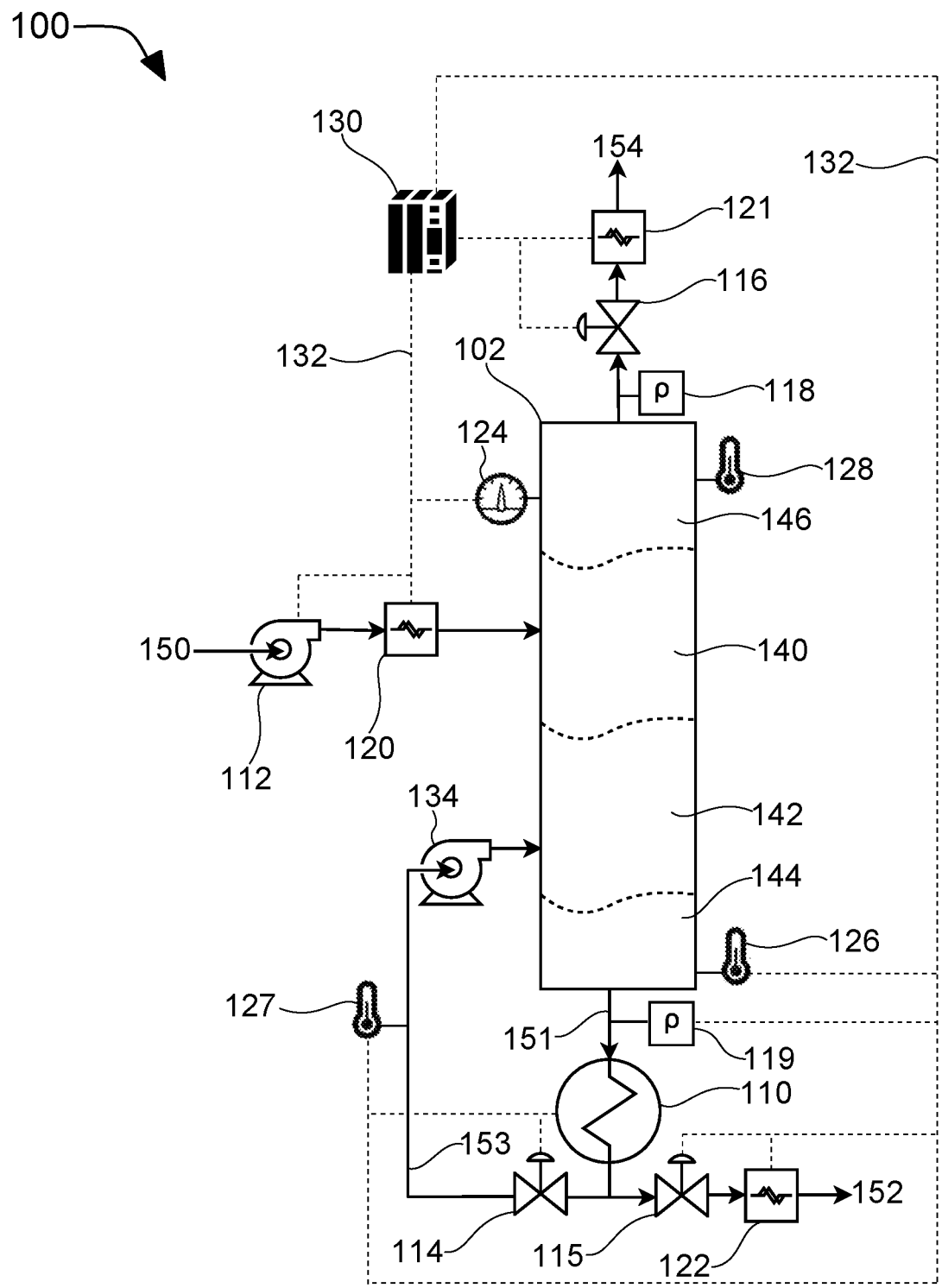
FIG. 1 is a process flow diagram of a solid-liquid separations unit operation.

Referring now to the Figures, FIG. 1 shows a process flow diagram 100 of a solid-liquid separations unit operation that may be used in the described devices, systems, and methods. The solid-liquid separations unit is a downcomer, in this instance. A slurry stream 150, comprising a solid and a carrier liquid, is pumped by a pump 112 through a flow meter 120 and into a vessel 102. In this example, the solid is carbon dioxide and the carrier liquid is isopentane. The vessel 102 is a vertical purifying column and so solid carbon dioxide begins to settle relative to the isopentane, due to density differences. The settling solids, driven by gravity, preferentially displace a portion of the carrier liquid upward. This settling occurs primarily in the inlet section 140. The solids pass into the heating section 142, where a hot liquid stream 153 is passed into the heating section 142, providing energy to heat the slurry. In this example, the hot liquid stream 153 is a liquid carbon dioxide. The hot liquid stream 153 has two effects. First, the heat sinters a portion of the solid particles of carbon dioxide, driving the carrier liquid out of the pores and interstitial spaces. The static pressure in the column further enhances this sintering. Second, the heat eventually melts the solids entirely into a product liquid stream 151. In the present example, the liquid carbon dioxide is heavier than the isopentane, further driving the isopentane up the column, with the liquid carbon dioxide driven downward into product exit section 144. The now majority carrier liquid stream 154 is therefore driven upward by displacement into carrier liquid exit section 146 and out of the vessel, past a density meter 118, a flow meter 121, and a valve 116. Carrier liquid exit section 146 also has a pressure transmitter 124 and a temperature transmitter 128. In other embodiments, these instruments can be placed in other locations, such as the carrier liquid outlet. The product liquid stream 151 exits the vessel past a temperature transmitter 126 and a density meter 119 and is heated in a heat exchanger 110. A portion of the heated product liquid stream is passed through valve 114 as hot recycle liquid stream 153, which passes temperature transmitter 127 and is pumped by pump 134 into the vessel, as discussed previously. The remainder of the heated product liquid stream passes valve 115 and flow meter 122 as final product liquid stream 152. Controller 130 receives and transmits signals 132. The instruments provide process information to the controller 130 while the pumps, valves, and heat exchanger receive instructions from the controller 130 to control flow rates, pressure, and temperature.

In other embodiments, the vessel may be horizontal, the flow of solids may be from bottom to top, or the solids may be less dense than the carrier liquid. In those instances, settling would be avoided.

Figure 2:
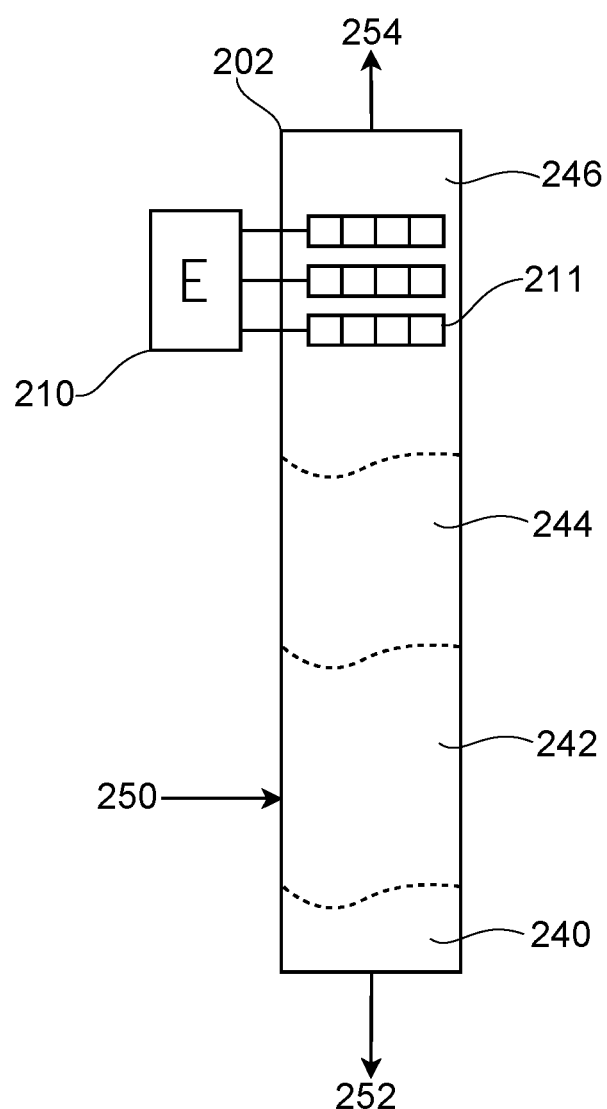
FIG. 2 is a process flow diagram of a solid-liquid separations unit operation.

FIG. 2 shows a process flow diagram 200 of a solid-liquid separations unit operation that may be used in the described devices, systems, and methods. A slurry stream 250, comprising a solid and a carrier liquid, is pumped at a high inlet pressure into a vessel 202 in inlet section 242. The vessel 202 is a vertical purifying column, but the inlet pressure acts to compress and sinter at least a portion of the solids in lateral and transverse directions through the Poisson ratio, expelling the carrier liquid from interstitial space between and pores in the particles of the solid. Because the slurry 250 is confined, and the Poisson ratio is positive, the slurry 250 will expand orthogonally. The slurry 250 cannot get wider, so it pressurizes itself. The carrier liquid is driven downward into carrier liquid outlet section 240. The solids pass upwards by this lateral and transverse force into the sintering section 244, which is heated by the product liquid stream 254 in the heating section 246. This sintering further fuses particles of the solid and collapses pores in the particles of the solid, displacing more of the carrier liquid downward. The sintering is enhanced by higher pressures. The sintered solids are driven further upwards into heating section 246 by the displacement of the carrier liquid downward. The heat, provided by coils 211 of resistive electric heater 210, melt the sintered solids entirely into a product liquid stream 254. The now majority carrier liquid stream 252 is driven downward through the carrier liquid exit section 240 and out of the vessel 202. The product liquid stream 254 exits the vessel 202 through heating section 246.

Figure 3:
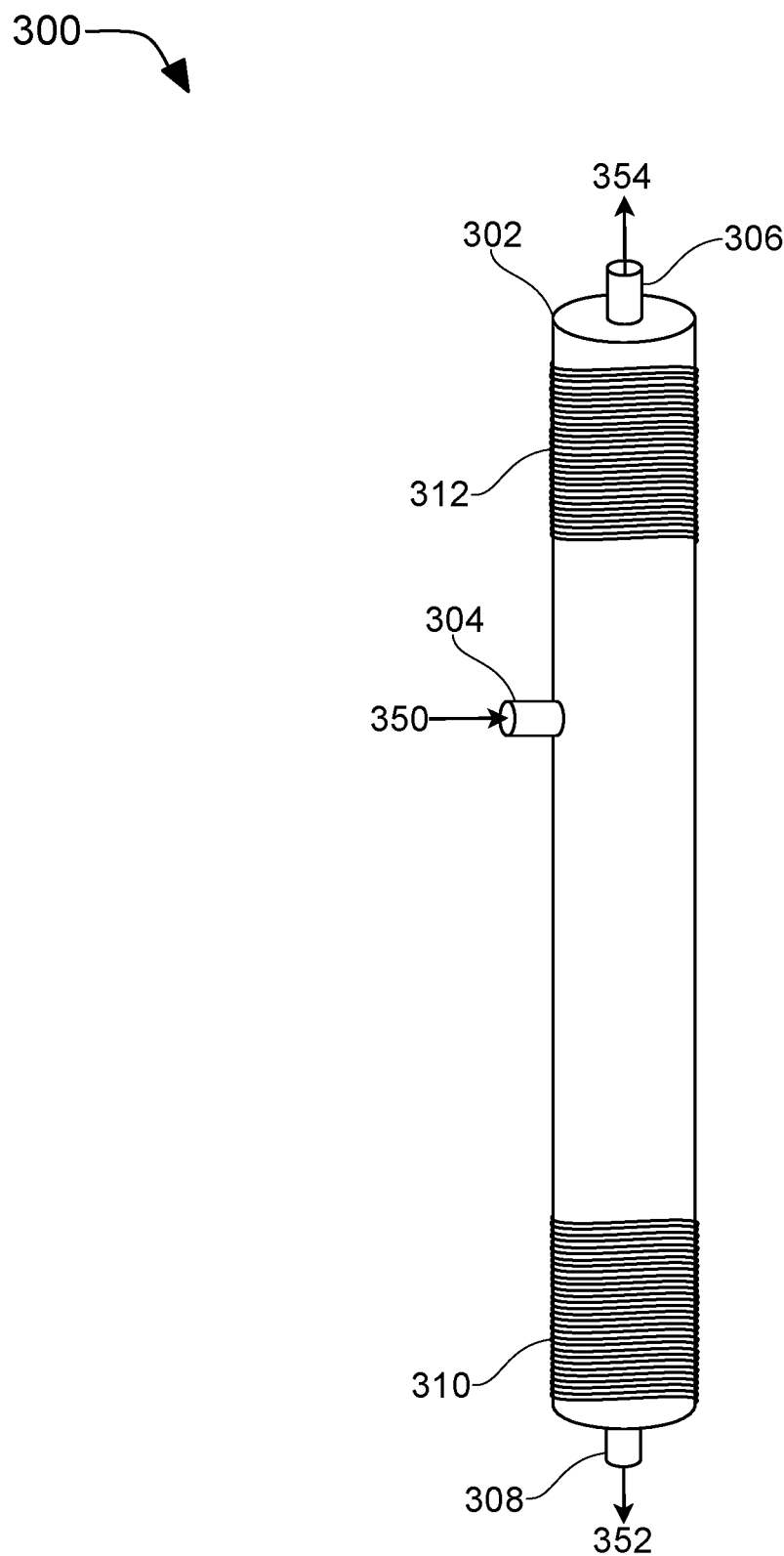
FIG. 3 is a front-top perspective view of a vessel.

FIG. 3 shows a front-top perspective view 300 of a vessel that may be used in the described devices, systems, and methods. Vessel 302 comprises a slurry inlet 304, a product outlet 308, a carrier liquid outlet 306, a heater 310, and a cooler 312. A slurry stream 350, comprising a solid and a carrier liquid, is pumped into vessel 302 through slurry inlet 304. A portion of the solid settles by gravity downward, driving a portion of the carrier liquid upward. The solids passing downward are heated by the heater 310, which first sinters the solids by fusing particles of the solid together and collapsing pores in the particles of the solid, and then melting the solid to form a product liquid 352, which exits through product outlet 308. Both sintering and melting displace further portions of the carrier liquid upward. A majority of the carrier liquid is driven upwards by the displacement from the solids, such that the carrier liquid 354 exits out the carrier liquid outlet 306. Cooler 312 cools the carrier liquid before it exits so that any of the product liquid that may have mixed in the carrier liquid may be frozen and settled out of the carrier liquid. In some embodiments, heater 310 is a resistive heater. In other embodiments, heater 310 is a tube through which a hot fluid is passed. In some embodiments, the cooler is a tube through which a coolant is passed. Insulation for both ends is not shown for clarity.

In some embodiments, the carrier liquid is recycled to collect more solids and is returned to the vessel, thus having a less stringent requirement for solids removal. For example, when the carrier liquid is isopentane and the solids are carbon dioxide, the isopentane removed would be cooled and used to desublimate further carbon dioxide to form the solids. As such, for this instance, dissolved carbon dioxide contaminants or some solid carbon dioxide in the isopentane would be acceptable. In some embodiments, substantially all of the carrier liquid is removed through the carrier liquid outlet, resulting in a substantially pure carbon dioxide product liquid. "Substantially pure," in this instance, is intended to mean at least 95 wt % and preferably at least 99 wt % carbon dioxide.

FIG. 4 shows a method 400 for separating solids and liquids that may be used in the described devices, systems, and methods. At 401, a slurry is passed into a purifying section of a vessel. The slurry includes particles of a solid and a carrier liquid. At 402, the particles of the solid are conveyed preferentially towards a heating zone of the purifying section versus the carrier liquid. At 403, the solids displace a first portion of the carrier liquid away from the heating zone of the purifying section. At 404, the heating zone of the purifying section is heated. At 405, the carrier liquid is driven out of the vessel.

FIG. 5 shows a method 500 for separating solids and liquids that may be used in the described devices, systems, and methods. At 501, a slurry is passed into a purifying section of a vessel. The slurry includes particles of a solid and a carrier liquid. At 502, the particles of the solid are conveyed preferentially towards a heating zone of the purifying section versus the carrier liquid. At 503, the solids displace a portion of the carrier liquid away from the heating zone of the purifying section. At 504, the heating zone of the purifying section is heated, sintering a portion of the particles of the solid, driving a portion of the carrier liquid out. At 505, the solids melt to form a product liquid, driving a further portion of the carrier liquid out. At 506, the carrier liquid is driven out of the vessel. At 507, the product liquid is driven out of the vessel. In some embodiments, the product liquid is more dense than the carrier liquid and drives the carrier liquid out by settling below the carrier liquid.

In some embodiments, the vessel has a recycle outlet that recycles at least a portion of the one or more particles of the product solid to the inlet.

In some embodiments, the heater may be tubes carrying a hot fluid, resistive heating elements, or a combination thereof. These may pass through the purifying section, be strapped to an outside of the purifying section, or a combination thereof.

In some embodiments, the carrier liquid may include water, hydrocarbons, liquid ammonia, cryogenic liquids, or a combination thereof. In some embodiments, the solids may include water, hydrocarbons, ammonia, solid acid gases, or a combination thereof.

Acid gases include carbon dioxide, nitrogen oxide, sulfur dioxide, nitrogen dioxide, sulfur trioxide, hydrogen sulfide, and other, similar gases.

In some embodiments, the vessel may include pressure transmitters, temperature transmitters, flow meters, density meters, turbidity meters, or a combination thereof. In some embodiments, the vessel may include at least one valve on the product liquid outlet, at least one valve on the carrier liquid outlet, or a combination thereof. In some embodiments, the vessel may include a controller that receives process information from the meters above. The controller may control a combination of pumps, valves, heat exchangers, coolers, and other devices.

The invention claimed is:

1. A method for separating solid carbon dioxide particles from a carrier liquid and producing a substantially pure liquid carbon dioxide stream from the separated solid dioxide particles, the method comprising the steps of:
   a. introducing a slurry stream (150) comprising a carrier liquid and solid carbon dioxide particles into an inlet section (140) of a vertical column vessel (102) under pressure;
   b. allowing the solid carbon dioxide particles to settle by gravity into the lower end of the vertical column vessel (102) which defines a heating section (142), while displacing the less dense carrier liquid up, towards the upper end of the vertical column vessel (102);
   c. heating the heating section (142) of the vertical column vessel (102) to melt the solid carbon dioxide particles to form a product liquid stream (151) of substantially pure carbon dioxide;
   d. driving a majority carrier liquid stream (154) out of the vertical column vessel (102) through a carrier liquid stream outlet extending through the top of the vertical column vessel (102); and
   e. driving the product liquid stream (151) of substantially pure carbon dioxide out of the vertical column vessel (102) through a product outlet at the lower end of the vertical column vessel (102) that is separate and distinct from the carrier liquid outlet.

2. The method of claim 1, wherein heating of the heating section is accomplished by:
   f. passing a portion of the product liquid stream (151) of substantially pure carbon dioxide exiting through the product outlet, through a heat exchanger (110) external of the vertical column vessel (102), thereby increasing the temperature of the portion of the product liquid stream (151) of substantially pure carbon dioxide; and
   g. recirculating the portion of the product liquid stream (151) of substantially pure carbon dioxide of increased temperature into the heating section (142) of the vertical column vessel (102).

3. The method of claim 1, wherein the carrier liquid is isopentane.

* * * * *